UNITED STATES PATENT OFFICE.

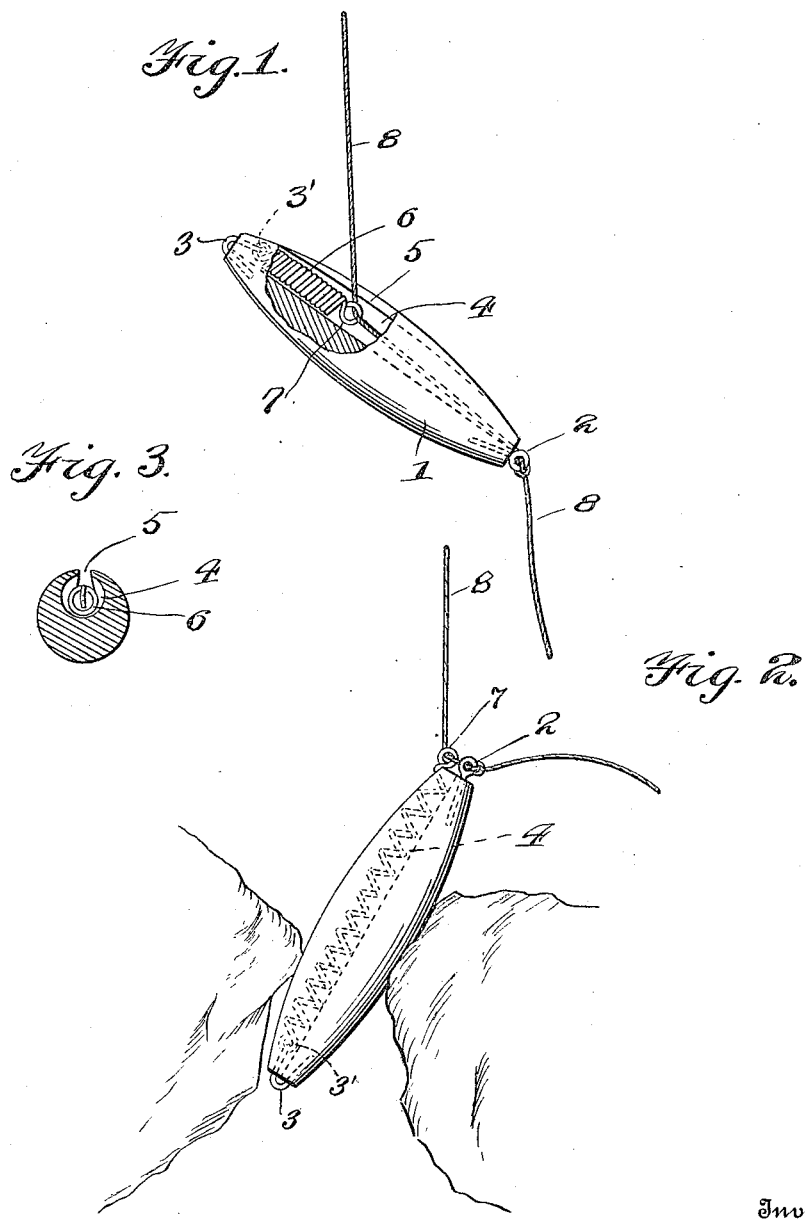

FRANK J. VOLK, OF CLEVELAND, OHIO.

FISHING-SINKER.

1,182,822.   Specification of Letters Patent.   Patented May 9, 1916.

Application filed September 8, 1915.   Serial No. 49,539.

*To all whom it may concern:*

Be it known that I, FRANK J. VOLK, a citizen of the United States, residing at Cleveland, in the county of Cuyahoga and State of Ohio, have invented new and useful Improvements in Fishing-Sinkers, of which the following is a specification.

This invention relates to piscatorial appliances and more particularly to sinkers.

One of the principal objects of the invention is the provision of a sinker simple in construction and of few parts which will automatically free itself when caught by simply pulling firmly upon the fishing line.

Another object of the invention is to provide a fishing sinker so constructed that when snagged or caught between a rock that a pulling force exerted upon the fishing line will cause a reversal of the position of the sinker from end to end.

Further objects of the invention will appear as the following specific description is read in connection with the accompanying drawings which form a part of this application, and in which:—

Figure 1 is a side elevation showing the normal position of the sinker when suspended on a line. Fig. 2 is a similar view showing the position of the parts when the sinker is caught between a pair of rocks and strain is applied to the fishing line. Fig. 3 is a transverse sectional view.

Referring more particularly to the drawing, 1 represents the body of the cushion sinker which, as shown, is in the form of an elongated oval having screw eyes 2 and 3 secured in opposite ends thereof. Extending the full length of the sinker and eccentric to its longitudinal axis, is a channel 4 open throughout its length by means of a narrow slot 5, said channel receiving at one end a portion of the screw eye 3 which is bent between its ends to have a portion thereof lie within said channel. Secured to the eye 3' of the screw eye 3 and lying within the channel 4, is a spring 6 having an eye 7 at its free end through which the fishing line 8 is passed and attached to the screw eye 2.

When suspended in normal position upon the fishing line the sinker assumes a position at approximately a 45° angle to the vertical. In this position, should the sinker catch between two rocks above the center thereof, a pull upon the fishing line will cause the expansion of the spiral spring to the position shown in Fig. 2 and as the sinker tapers toward its then lower end it will be readily freed from the rocks. If the line beyond the spring and the sinker should catch on a snag the spring traveling over the line when a pulling strain is placed thereon, will free the same, as will be readily understood.

What is claimed is:—

A fishing sinker comprising a body, screw eyes at opposite ends of the body, said body having a longitudinal channel positioned eccentrically to the longitudinal axis of the body and open throughout the length of the sinker, a line attached to the loop in one of the eyes and lying within the channel, and a spring attached to the loop in the opposite eye and having a loop in its free end, said spring lying within the channel and having the line passing through the loop.

In testimony whereof I affix my signature in presence of two witnesses.

FRANK J. VOLK.

Witnesses:
 FRED S. REISER,
 JOHN VOLK.

Copies of this patent may be obtained for five cents each, by addressing the "Commissioner of Patents. Washington, D. C."